(12) United States Patent
Liao

(10) Patent No.: US 6,474,858 B1
(45) Date of Patent: Nov. 5, 2002

(54) ILLUMINATION DEVICE WITH AN OUTER TUBE ENCASING A TRANSPARENT CENTER ROD

(76) Inventor: Ching-Shin Liao, No. 2, Lane 51, Chung-Mei Street, Taichung (TW)

(*) Notice: Subject to any disclaimer, the term of this patent is extended or adjusted under 35 U.S.C. 154(b) by 0 days.

(21) Appl. No.: 09/863,372

(22) Filed: May 24, 2001

(51) Int. Cl.[7] ............................................. F21V 7/04
(52) U.S. Cl. ..................... 362/551; 362/582; 362/101; 362/318; 362/84; 362/806; 362/278
(58) Field of Search ............................ 362/551, 582, 362/101, 96, 318, 84, 102, 278, 806

(56) References Cited

U.S. PATENT DOCUMENTS 6,183,102 B1 * 2/2001 Mortz et al. .................. 362/84
6,241,359 B1 * 6/2001 Lin .............................. 362/96

* cited by examiner

Primary Examiner—Sandra O'Shea
Assistant Examiner—Ronald E. DelGizzi
(74) Attorney, Agent, or Firm—Bacon & Thomas, PLLC

(57) ABSTRACT

A versatile illuminating device. The device includes one outer tube housing a transparent inner tube and a pedestal to support the outer tube and center rod. The pedestal has a light source element. The outside appearance of the outer tube may be formed in various desired shapes. The center rod has its periphery embossed with bulged and dented patterns and coated with different colors. The light source element may project light on the patterns of the center rod to generate illumination of different colors on the patterns, thus forming an adornment having a light source. The adornment also may be made to be handheld.

9 Claims, 8 Drawing Sheets

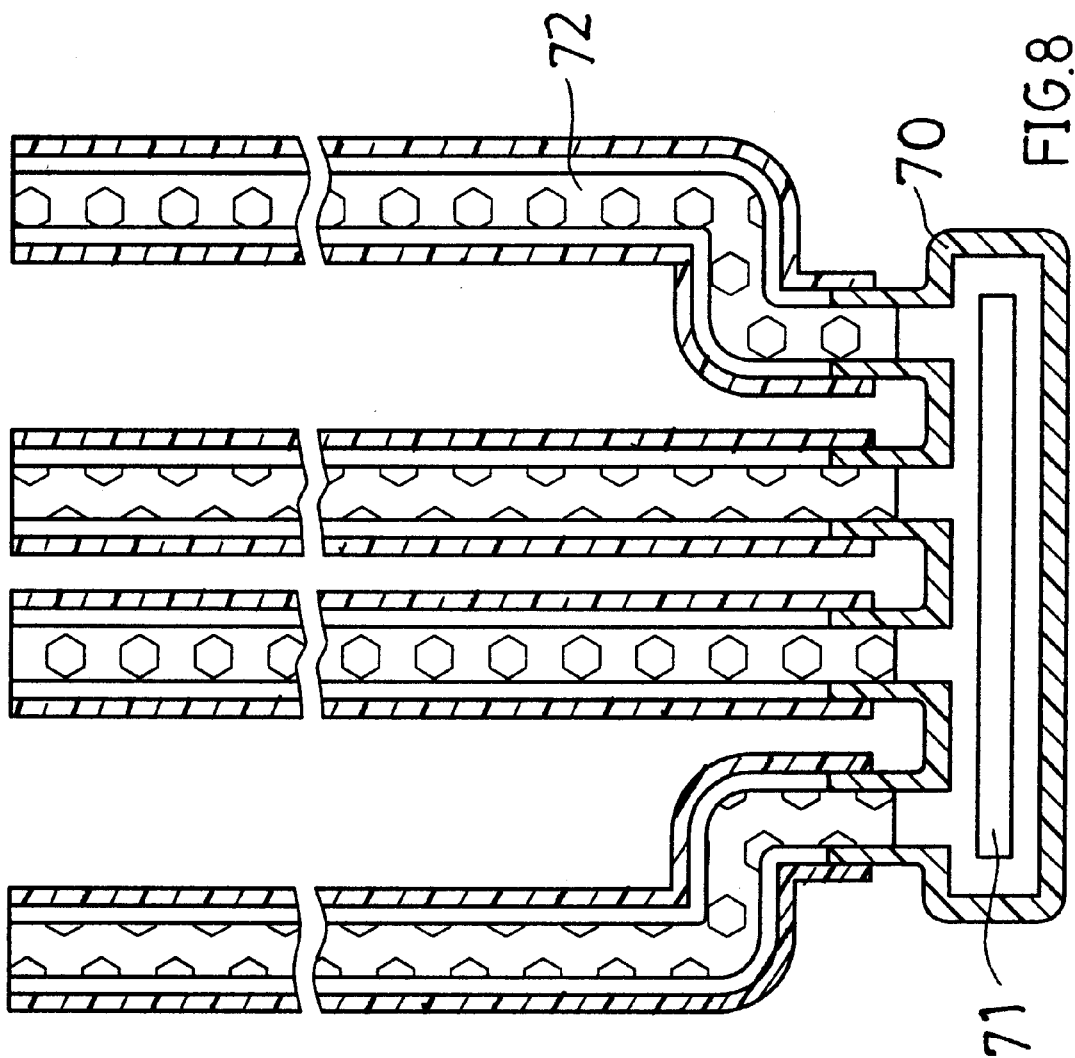

ILLUMINATION DEVICE WITH AN OUTER TUBE ENCASING A TRANSPARENT CENTER ROD

BACKGROUND OF THE INVENTION

This invention relates to a versatile illuminating adornment and particularly an adornment that has alterative lighting and is capable of turning a living room to a joyful entertaining place.

The growing prosperity of society has spawned a lot of entertaining activities and occasions such as karaoke houses, dance hall and the like. Many people like to have parties or celebrations at such locations. In order to add more amusing effects and create more entertaining atmosphere, many of these locations have alterative lighting features and facilities. For instance, some boxes have Christmas lights or revolving lights to generate blinking and colorful visual effects, or to project alterative lights and shadows on the walls to create amusing effects and appealing atmosphere. However those Christmas lights or revolving lights have to be installed in advance. Once installed, their shapes or appearances often cannot be changed easily to suit different people's desires or preference. Moreover, the public karaoke houses and dance hall often attract people of different tastes and backgrounds. It is not unusual that different groups of people run into confrontation or squabble at these places, or even break out fighting. Hence a joyful event could turn to a sorrow ending.

Thus it is desirable to increase the versatility of the alterative lighting so that it can produce changing visual lighting effect in the entertaining sites to suit the preference of different customers at a most economical way, or to provide a simple and convenient means to turn a living room of a house to a joyful place so that household members can have entertainment at home without going to the public locations outside and to avoid unnecessary troubles or risks.

SUMMARY OF THE INVENTION

It is therefore an object of this invention to provide an illuminating adornment that has a light source projecting on the patterns of a center rod to make the patterns generating illumination for decorative purpose. The adornment may also be handheld to further increase its versatility and usefulness.

To attain the foregoing object, the illumination adornment according to this invention consists of at least one outer tube and a transparent center rod housed in the outer tube. The outer tube and center rod are mounted on a pedestal which has a light source element located therein. The outside appearance of the outer tube may be shaped in a special form desired. The peripheral surface of the center rod may be embossed with bulged and dented patterns and coated with different colors. When the light source element projects light on the patterns of the center rod, the patterns and different color portions will illuminate lights of different colors, and thus forms an illuminating adornment. The adornment may also be handheld.

The foregoing, as well as additional objects, features and advantages of this invention will be more readily apparent from the following detailed description, which proceeds with reference to the accompanying drawings.

BRIEF DESCRIPTION OF THE DRAWINGS

FIG. 8 is a schematic view of a fifth embodiment of this invention.

DESCRIPTION OF THE PREFERRED EMBODIMENTS

Referring to FIGS. 1 through 8, this invention mainly consists of:

A control box 10 which has a plurality of switches and a controllable program IC and a power supply.

At least one pedestal 20 which has a light source element 21 located therein and a wire linking to the control box 10.

Figure 1:
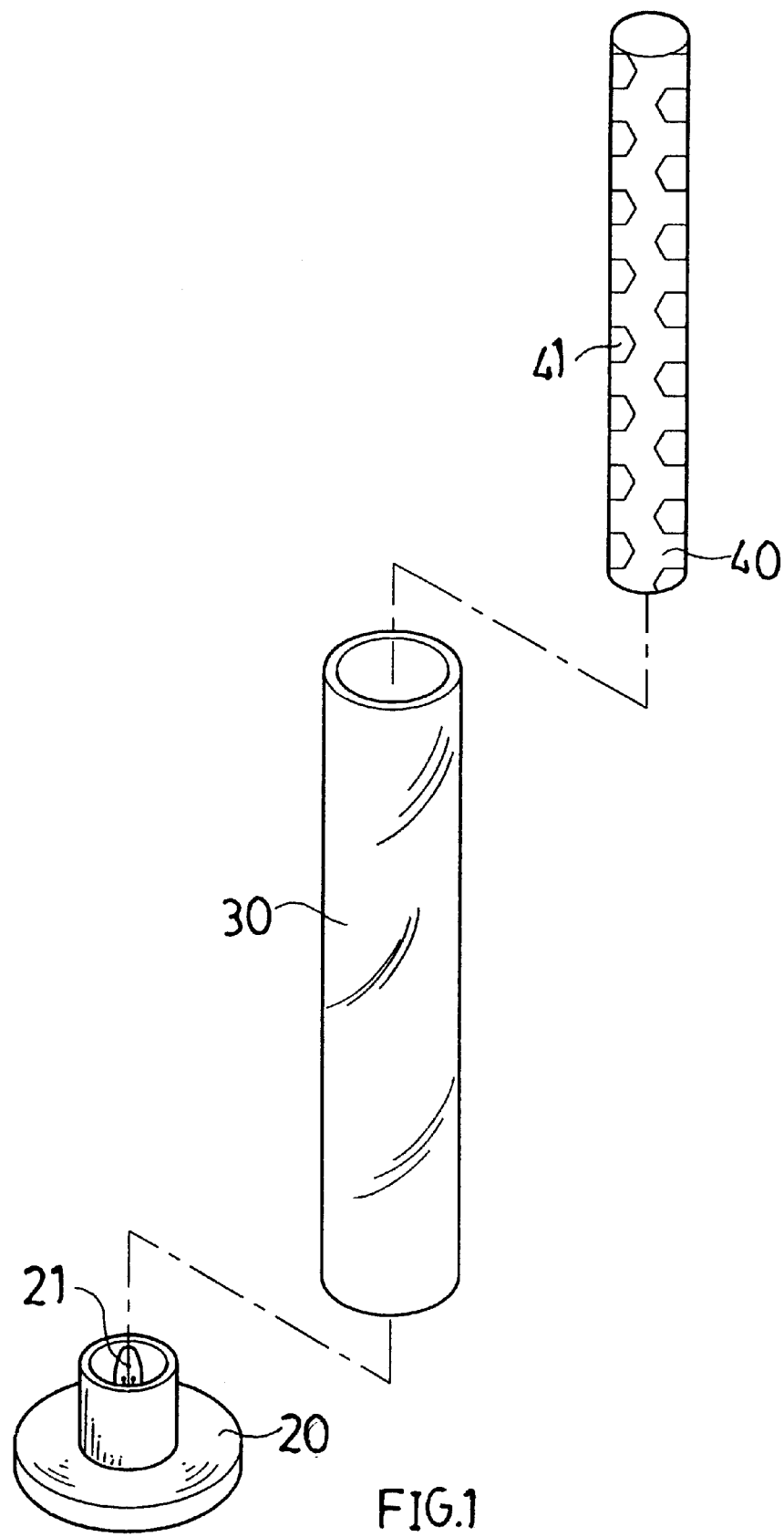
FIG. 1 is an exploded view of this invention.
Figure 2:
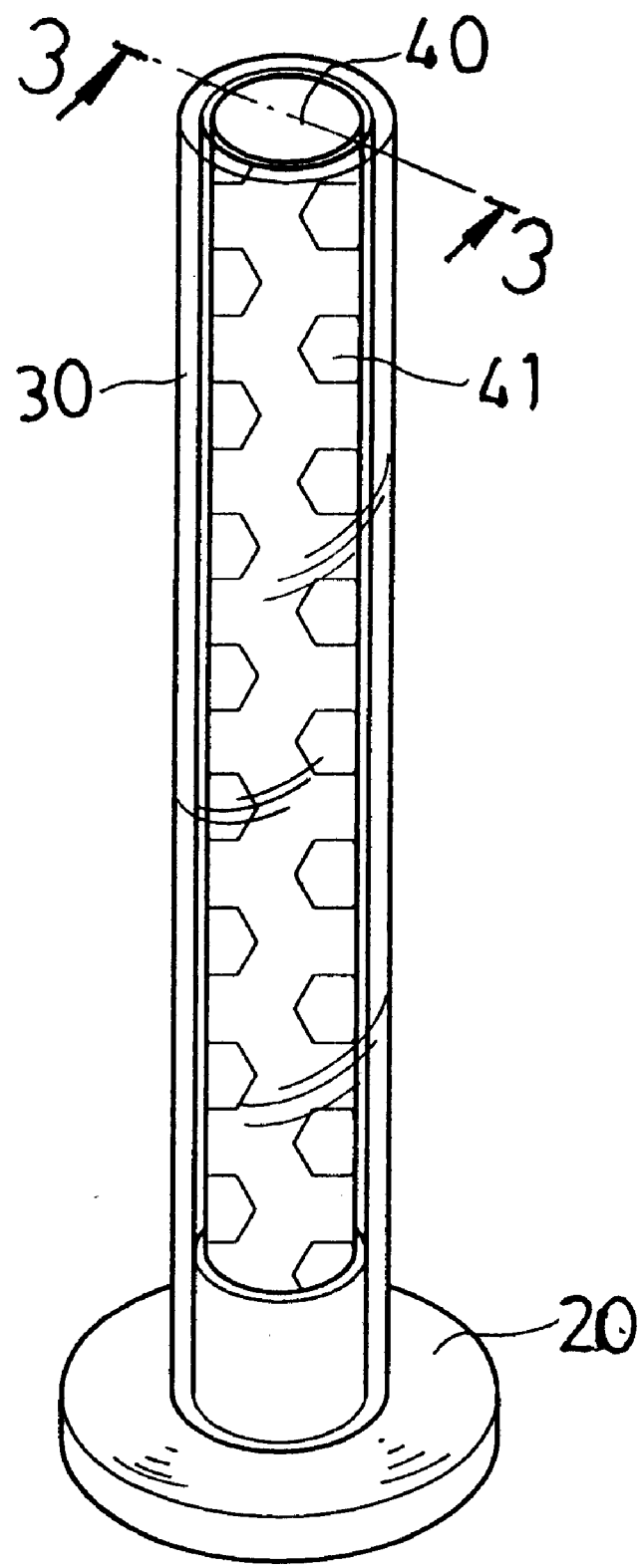
FIG. 2 is a perspective view of this invention.
Figure 3:
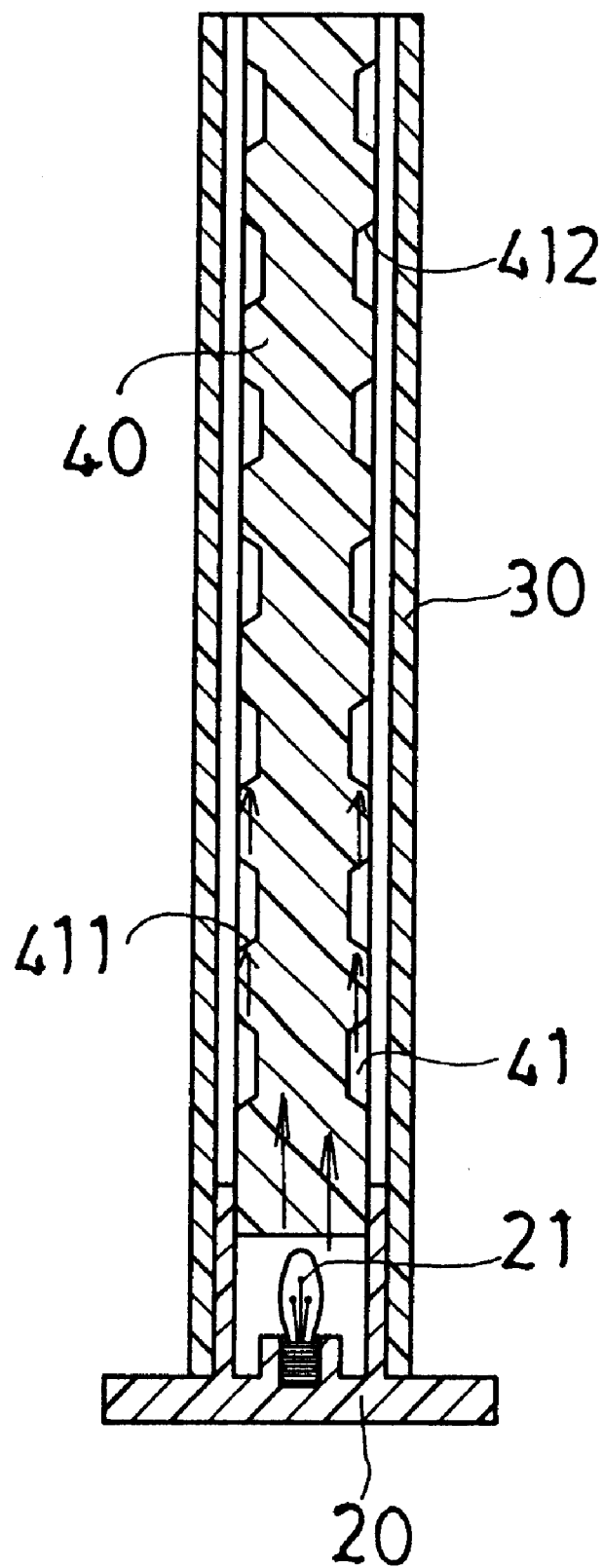
FIG. 3 is a sectional view of this invention taken along line 3—3 in FIG.2.
Figure 4:
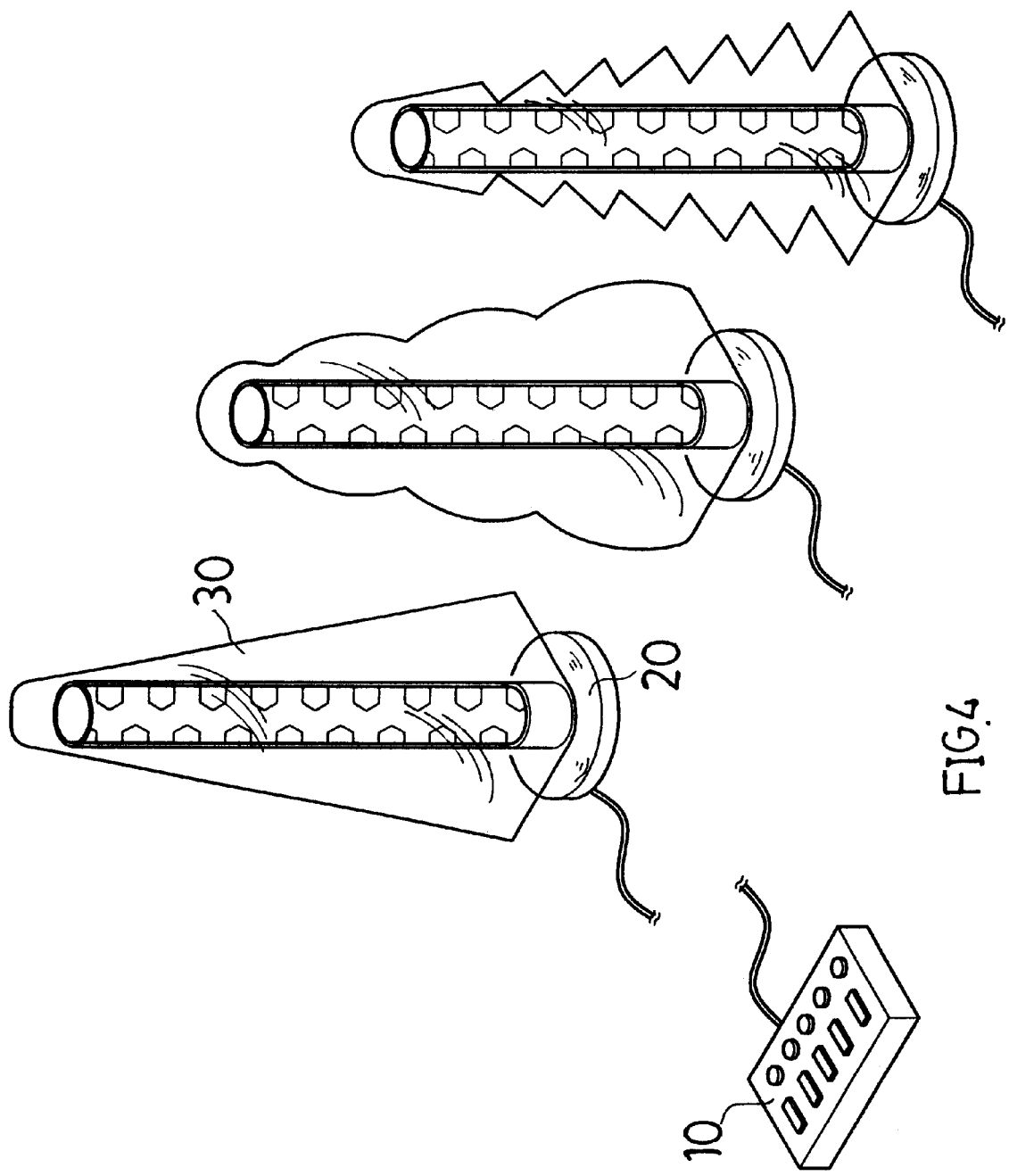
FIG. 4 is a schematic view of a first embodiment of this invention.

At least one transparent and flexible outer tube 30 mounted on the pedestal 20 at the outer rim thereof by forced coupling. The outer tube 30 may have a selected outside appearance such as cylinder, pyramid, Christmas tree and the like (as shown in FIG. 4).

At least one transparent and flexible center rod 40 with the peripheral surface embossed with bulged and dented patterns 41 (such as stars, moons, hearts, triangles, circles, or other irregular forms, depends on users' preference). The center rod 40 is mounted at the inner rim of the pedestal 20 by forced coupling and is held inside the outer tube 30.

By means of aforesaid construction, the outer tube 30 and center rod 40 are mounted on the pedestal 20. A plurality of the assemblies of the outer tube 30 which may have different outside shapes and appearances, and pedestal 20 and center rod 40 may be placed at locations desired (such as in various rooms, boxes of public saloons). When music is played and broadcasted, the light source element 21 in the pedestal 20 may be activated to emit light through the control box 10 by changing the controllable program IC. As the center rod 40 is transparent, and the bulged and dented patterns 41 have respectively first projection surfaces 411 and second projection surfaces 412, when the light source element 21 projects light on the patterns 41, the first and second projection surface 411 and 412 will be illuminated and generate light. The center rod 40 may have a plurality of different patterns 41 and thus may generate different patterns of light. As a result, this invention can produce amusing video and audio effects. This is one of the advantages of this invention.

Figure 5:
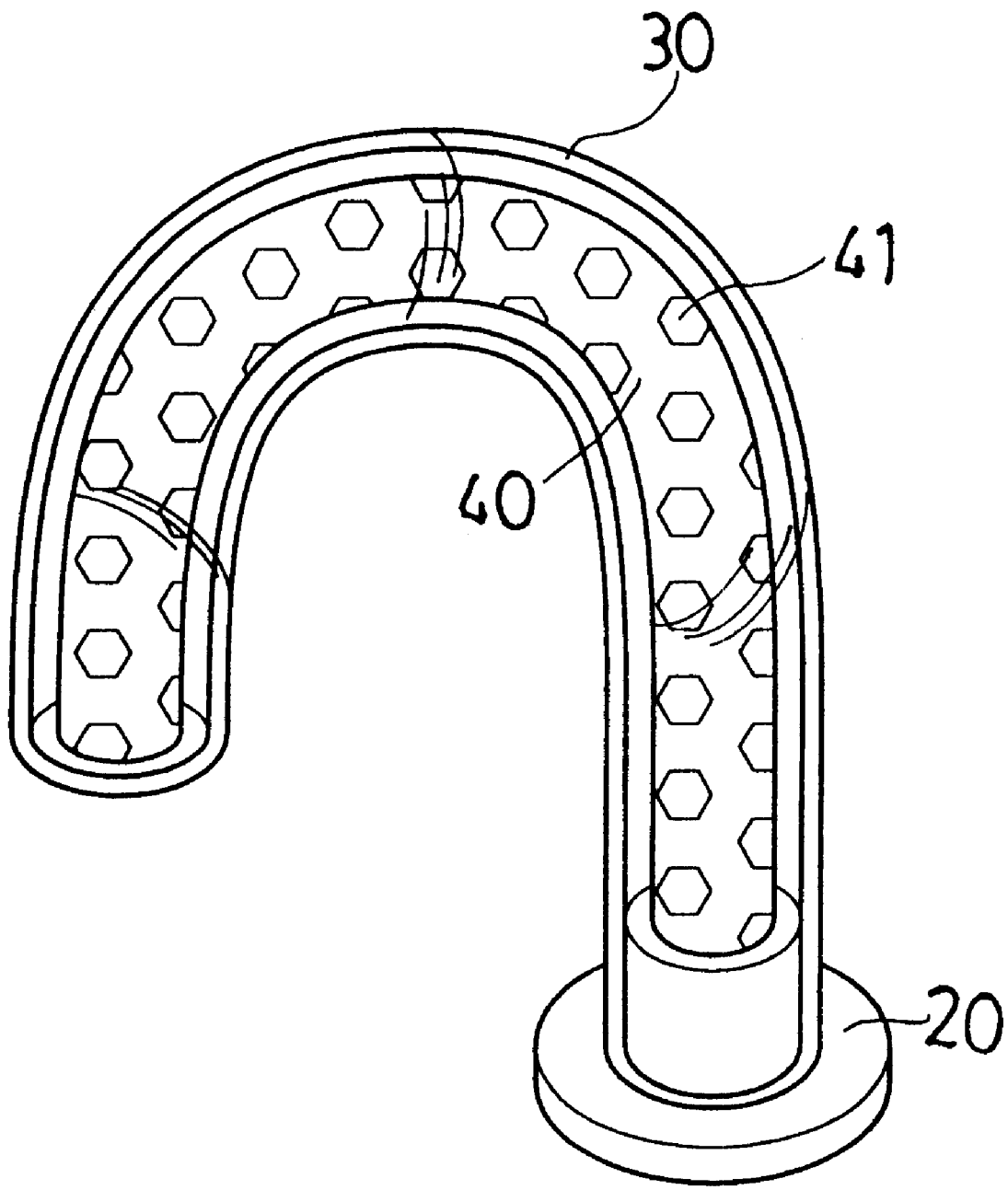
FIG. 5 is a schematic view of a second embodiment of this invention.

As the outer tube 30 and center rod 40 are flexible, the adornment of this invention thus may be bent to a shape desired, such as circular, triangular or the like (shown in FIG. 5). This is another advantage of this invention.

Figure 6:
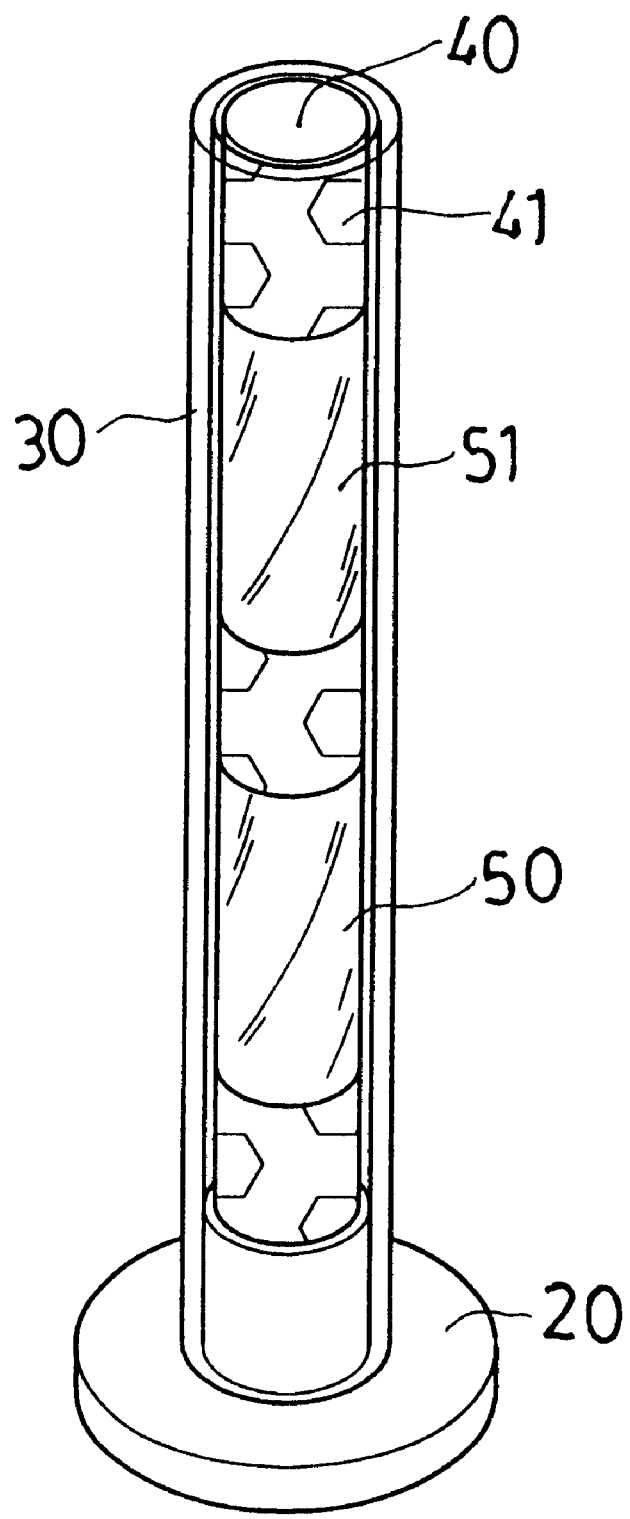
FIG. 6 is a schematic view of a third embodiment of this invention.

Furthermore, the outside surface of the center rod 40 may be adhered to a plurality of fluorescent stickers 50 and 51 of different colors (as shown in FIG. 6) so that when the light source element 21 projects light on the first and second projection surface 411 and 412, the projecting light will further pass through the fluorescent stickers 50 and 51 to generate light of different colors to add more amusing effect.

Figure 7:
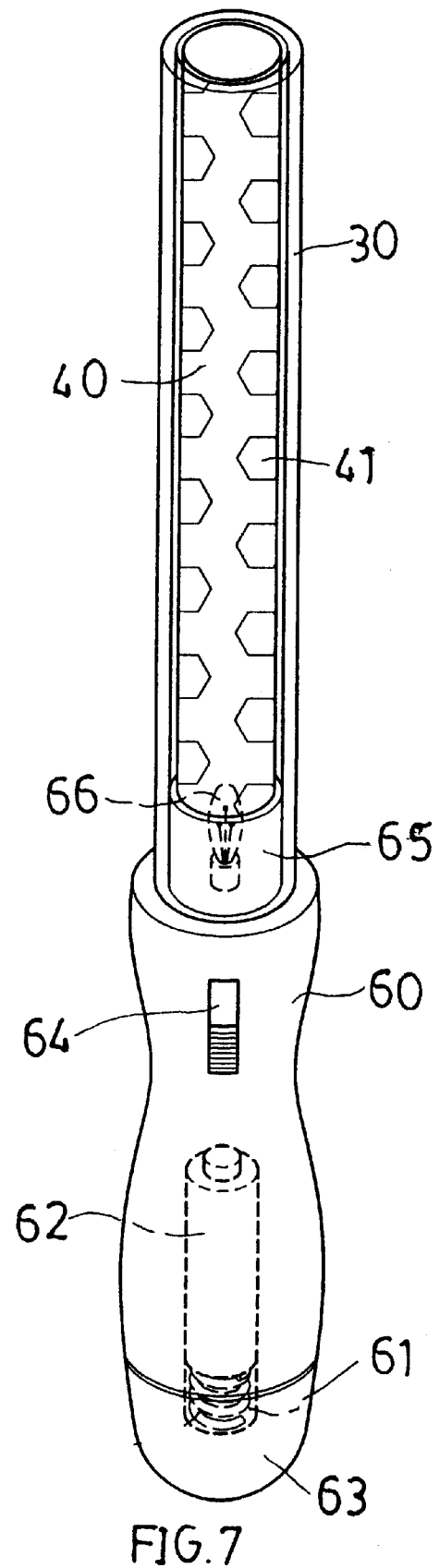
FIG. 7 is a schematic view of a fourth embodiment of this invention.

The outer tube 30 and center rod 40 may also be made in the form of a handle 60 as shown in FIG. 7.

The handle 60 has a closed cavity 61 formed at the bottom end thereof for housing batteries 62 to supply electric power and for engaging with a cap 63 to prevent the batteries 62 from falling out of the cavity 61. The handle 60 has a switch 64 located at a selected spot and a wedge section 65 located at a front end which has a light source element 66 disposed therein.

The outer tube 30 is mounted on the outer peripheral rim of the wedge section 65 by forced coupling. The center rod 40 is mounted on the inner rim of the wedge section 65 by forced coupling. The adornment thus formed may become a lighting rod and may be held by hand to wave or brandish when music is playing to add more amusing and entertaining effect.

FIG. 8 shows another embodiment of this invention which includes a pedestal 70, a light source element 71 located in the pedestal 70, and one or more center rod 72 mounted on the pedestal 70 above the light source element 71. The center rods 72 may be extended outwards in various directions to generate light at different locations at the same time. It thus can save light source and increase the effect.

Furthermore, the center rod 40 and 72 may also have respectively a closed cavity formed therein from the top end to the bottom end for holding water (not shown in the drawings). Light illumination may project on the waving water surface to generate different light fraction to increase additional amusing effect.

In summary, this invention offers the following advantages:

1. This invention employs a light source element to project light on the patterns of a center rod to enable the patterns generating illumination. It is an adornment equipped with a light source.
2. The outside surface of the center rod may be coated with fluorescent material of different colors to receive the projection of the light source element for generating different flashy illumination to increase lighting alteration.
3. The outer tube and center rod are flexible and may be formed in different shapes and lengths desired.
4. The outer tube may be shaped in different forms.
5. The outer tube and center rod may be mounted on a handle to form a handheld lighting rod.
6. The pedestal may contain one light source element and one or more center rods. The center rods may extend outwards in different directions to save light source and increase effect.
7. The center rod may have a closed cavity formed therein to hold water such that lighting of the center rod will create different light refraction through water wave and increase additional amusing effect.

What is claimed is:

1. A versatile illuminating adornment comprising at least one outer tube each encasing a transparent center rod and a pedestal for mounting the outer tube and the center rod, the pedestal having a light source element located therein, and wherein the outer tube and the center rod are mounted on a handle, the handle having a wedge section located at a front end and a light source element located therein to form a handheld lighting rod.

2. The versatile illuminating adornment of claim 1, wherein the outer tube comprises a transparent tubular element having an outer wall, the outer tube is flexible and is wedged on the pedestal.

3. The versatile illuminating adornment of claim 1, wherein the center rod is transparent and flexible, and has bulged and dented patterns embossed on the periphery thereof and is wedged in an inner rim of the pedestal.

4. The versatile illuminating adornment of claim 1, wherein the pedestal links to a control box which has a plurality of switches and a controllable program IC and a power supply.

5. The versatile illuminating adornment of claim 1, wherein the outer tube and the center rod are flexible, and are bendable to form different shapes.

6. The versatile illuminating adornment of claim 1, wherein the center rod has an outside surface coated with fluorescent material of different colors for generating light of different colors.

7. The versatile illuminating adornment of claim 1, wherein the pedestal has more than one center rod disposed thereon, the center rod being extended outwards to illuminate at different locations for saving the light source and increasing effect.

8. The versatile illuminating adornment of claim 1, wherein the center rod has a closed cavity located therein for holding water such that lighting of the center rod will generate different light refraction through water waving.

9. The versatile illuminating adornment of claim 2, wherein the pedestal links to a control box which has a plurality of switches and a controllable program IC and a power supply.

* * * * *